(12) United States Patent
Lee et al.

(10) Patent No.: US 7,916,622 B2
(45) Date of Patent: Mar. 29, 2011

(54) APPARATUS AND METHOD FOR ALLOCATING RESOURCES IN MOBILE COMMUNICATION SYSTEM

(75) Inventors: Jong-Hyeuk Lee, Anyang-si (KR); Sang-Boh Yun, Seongnam-si (KR); Dae-Young Park, Seoul (KR); Jong-Soo Seo, Seoul (KR); Won-Kyu Paik, Suwon-si (KR)

(73) Assignees: Samsung Electronics Co., Ltd (KR); Industry-Academic Cooperation Foundation, Yonsei University (KR)

( * ) Notice: Subject to any disclaimer, the term of this patent is extended or adjusted under 35 U.S.C. 154(b) by 882 days.

(21) Appl. No.: 11/833,036

(22) Filed: Aug. 2, 2007

(65) Prior Publication Data

US 2008/0031216 A1  Feb. 7, 2008

(30) Foreign Application Priority Data

Aug. 2, 2006  (KR) .................. 10-2006-0072843

(51) Int. Cl.
*H04J 11/00* (2006.01)
(52) U.S. Cl. ........ 370/206; 370/210; 370/329; 370/343; 375/346

(58) Field of Classification Search .................. None
See application file for complete search history.

(56) References Cited

U.S. PATENT DOCUMENTS

| | | | | |
|---|---|---|---|---|
| 6,031,827 A | * | 2/2000 | Rikkinen et al. | 370/330 |
| 6,256,508 B1 | * | 7/2001 | Nakagawa et al. | 370/312 |
| 2004/0213144 A1 | * | 10/2004 | Murakami et al. | 370/208 |
| 2006/0083291 A1 | | 4/2006 | Hongming et al. | 375/148 |

FOREIGN PATENT DOCUMENTS

| | | |
|---|---|---|
| JP | 2003-046481 | 2/2003 |
| JP | 2006-067118 | 3/2006 |
| KR | 1020050034885 | 4/2005 |

* cited by examiner

*Primary Examiner* — Chi H. Pham
*Assistant Examiner* — Shick Hom
(74) *Attorney, Agent, or Firm* — The Farrell Law Firm, P.C.

(57) ABSTRACT

Provided are an apparatus and method for allocating resources in a mobile communication system. The apparatus includes a modulating/coding unit for modulating transmission data of one or more users according to a predetermined modulation scheme and for outputting a complex signal; a 2-Dimensional (2D)/1-Dimensional (1D) converter for converting the complex signal into a 1D signal; and a re-modulator for reconstructing the 1D signal to a 2D signal and for allocating two components of the 2D signal to two different frequency bands.

10 Claims, 4 Drawing Sheets

CHANGE PHASE ALLOCATION

APPARATUS AND METHOD FOR ALLOCATING RESOURCES IN MOBILE COMMUNICATION SYSTEM

PRIORITY

This application claims priority under 35 U.S.C. §119 to an application filed in the Korean Intellectual Property Office on Aug. 2, 2006 and assigned Serial No. 2006-0072843, the contents of which are incorporated herein by reference.

BACKGROUND OF THE INVENTION

1. Field of the Invention

The present invention relates to an apparatus and method for allocating resources in a mobile communication system.

2. Description of the Related Art

One of the important issues considered in next generation mobile communication systems is which multiplexing technique will be selected to effectively allocate limited resources (i.e., frequency, time, and space) to users. This is because a Quality of Service (QoS) depends on the multiplexing technique.

The recently emerging Orthogonal Frequency Division Multiplex Access (OFDMA) scheme is basically the same as the Frequency Division Multiplex Access (FDMA) scheme except that, in the OFDMA scheme, advantageously, all users can share a Fast Fourier Transform (FFT) space in downlink transmission and sub-carriers can be allocated to the users according to a user data-transfer rate.

However, according to the principle of frequency orthogonality, two users cannot share one sub-channel in the OFDMA scheme. Therefore, as the number of users increases, it becomes more difficult to allocate resources to the users, resulting in unsatisfactory QoS. In addition, even if there is no interference between users in the OFDMA, it is likely that a user located in a cell boundary area cannot receive satisfactory QoS since interference caused by adjacent cells is high. In other words, the OFDMA scheme is limited because, when the number of users increases, resource allocation becomes complicated and frequency usage efficiency decreases.

In the next generation wireless mobile communication system in which a variety of multimedia services are required, there is a need to maintain a suitable QoS of each service and to improve a data transfer rate. In particular, the wireless mobile communication system has to support both a real time based service and a non-real time based service. Therefore, as a greater number of users want to receive services on a real time basis, there has been a problem in that maintenance of QoS becomes further difficult, and frequency efficiency decreases.

SUMMARY OF THE INVENTION

The present invention provides an apparatus and method for allocating resources in a mobile communication system.

The present invention also provides an apparatus and method for allocating resources in a mobile communication system by using a new multiplexing scheme.

According to one aspect of the present invention, there is provided an apparatus for allocating resources in a mobile communication system, the apparatus including: a modulating/coding unit for modulating transmission data of one or more users according to a predetermined modulation scheme and for outputting a complex signal; a 2-Dimensional (2D)/1-Dimensional (1D) converter for converting the complex signal into a 1D signal; and a re-modulator for reconstructing the 1D signal to a 2D signal and for allocating two components of the 2D signal to two different frequency bands.

According to another aspect of the present invention, there is provided a method of allocating resources in a mobile communication system, the method including modulating transmission data of one or more users according to a predetermined modulation scheme and for outputting a complex signal; converting the complex signal into a 1D signal; and reconstructing the 1D signal to a 2D signal and for allocating two components of the 2D signal to two different frequency bands.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention are described below with reference to the accompanying drawings. In the following description, well-known functions or constructions are not described in detail since they would obscure the invention in unnecessary detail.

Hereinafter, the apparatus and method of the present invention for allocating resources in a mobile communication system is described by allocating one sub-channel to two users, and thus the two users can share the same sub-channel, for exemplary purposes only. It will be understood by those of skill in the art that the present invention can also be applied to a method in which one sub-channel is allocated to two or more users, two or more multiplexing schemes, or two or more modulation schemes.

Figure 1:
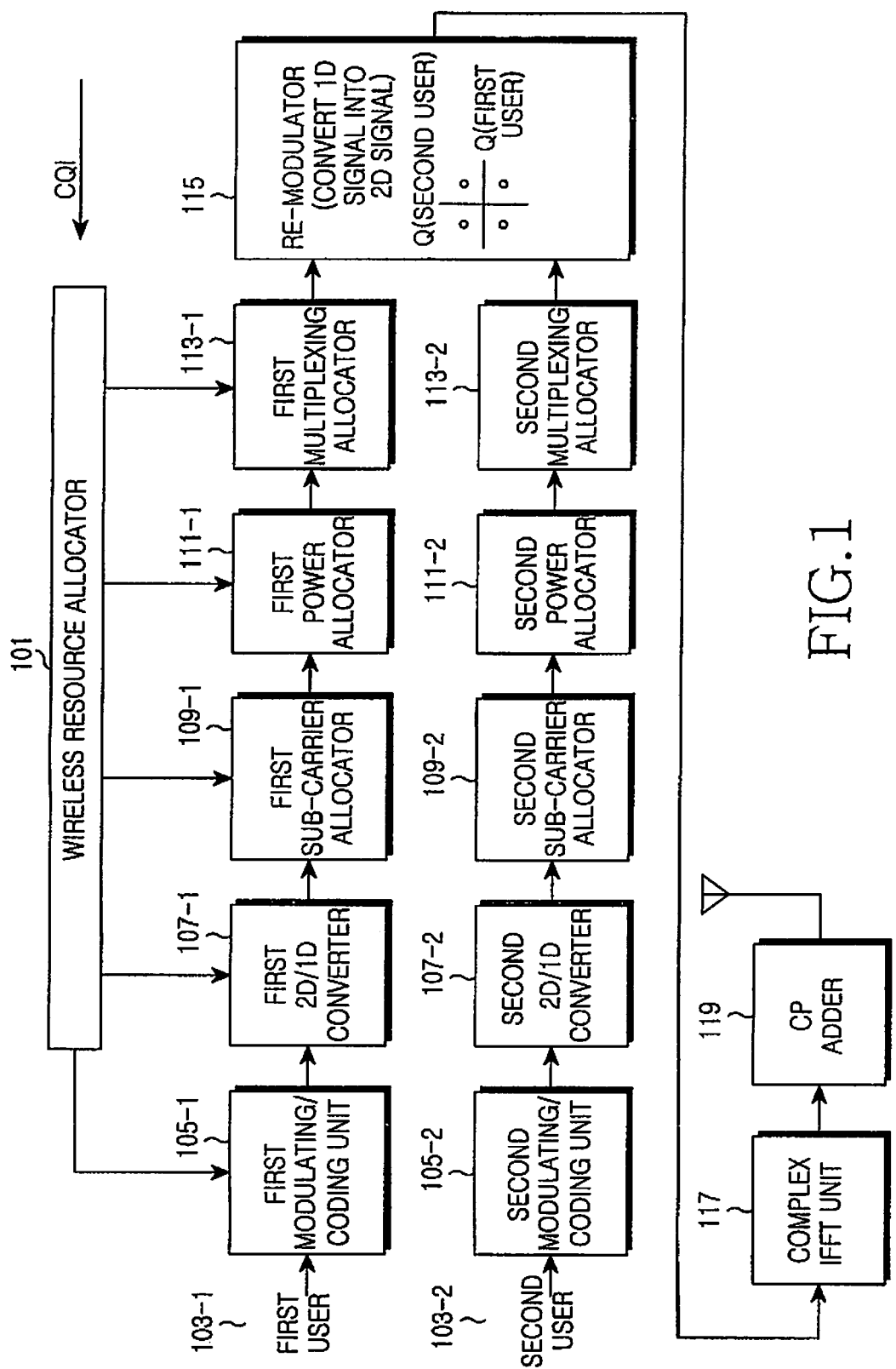
FIG. 1 is a block diagram of a transmitter according to the present invention.

FIG. 1 is a block diagram of a transmitter according to the present invention. The transmitter includes a wireless resource allocator 101, first and second modulating/coding units 105-1 and 105-2, first and second 2-Dimensional (2D)/1-Dimensional (1D) converters 107-1 and 107-2, first and second sub-carrier allocators 109-1 and 109-2, first and second power allocators 111-1 and 111-2, first and second multiplexing allocators 113-1 and 113-2, a re-modulator 115, a complex Inverse Fast Fourier Transform (IFFT) unit 117, and a Cyclic Prefix (CP) adder 119. Herein, it will be assumed that two users share the same sub-carrier.

Referring to FIG. 1, the wireless resource allocator 101 receives Channel Quality Information (CQI) from each user, allocates wireless resources (e.g., sub-carrier, power, and multiplexing scheme) to each user using the CQI, and outputs the allocation result to the first and second sub-carrier allocators 109-1 and 109-2, the first and second power allocators 111-1 and 111-2, and the first and second multiplexing allocators 113-1 and 113-2. In addition, the wireless resource allocator 101 determines a coding rate and modulation scheme for each user, and controls a re-modulation process.

The first and second modulating/coding units 105-1 and 105-2 perform channel-coding on transmission data of users 103-1 and 103-2 when the transmission data is delivered from an upper layer at a predetermined coding rate, and output complex signals by performing a signal-point mapping operation on symbols obtained by coding the data using the modulation scheme determined by the resource allocation 101. For example, the coding may be performed using a convolutional encoder, a turbo encoder, and a Low Density Parity Check (LDPC) encoder. Some examples of the modulation scheme include a Binary Phase Shift Keying (BPSK) method in which one bit (s=1) is mapped to one complex signal, a Quadrature Phase Shift keying (QPSK) method in which two bits (s=2) are mapped to one complex signal, an 8ary Quadrature Amplitude Modulation (8QAM) method in which three bits (s=3) are mapped to one complex signal, and a 16QAM method in which four bits (s=4) are mapped to one complex signal. Herein, different modulation schemes may be allocated to the two users.

The first and second 2D/1D converters 107-1 and 107-2 are respectively connected to the first and second modulating/coding units 105-1 and 105-2. The first and second 2D/1D converters 107-1 and 107-2 convert complex signals received from the first and second modulating/coding units 105-1 and 105-2 into 1D signals to be output to the first and second sub-carrier allocators 109-1 and 109-2. That is, a 2D complex signal of each user is converted into a 1D complex signal.

The first and second sub-carrier allocators 109-1 and 109-2 are respectively connected to the first and second 2D/1D converters 107-1 and 107-2. According to sub-channel allocation information input from the wireless resource allocator 101, the first and second sub-carrier allocators 109-1 and 109-2 allocate sub-channels with respect to signals input from the first and second 2D/1D converters 107-1 and 107-2.

The first and second power allocators 111-1 and 111-2 are respectively connected to the first and second sub-carrier allocators 109-1 and 109-2. According to power allocation information input from the wireless resource allocator 101, the first and second power allocators 111-1 and 111-2 allocate power with respect to signals input from the first and second sub-carrier allocators 109-1 and 109-2.

The first and second multiplexing allocators 113-1 and 113-2 are respectively connected to the first and second power allocators 111-1 and 111-2. According to multiplexing scheme allocation information input from the wireless resource allocator 101, the first and second multiplexing allocators 113-1 and 113-2 allocate multiplexing schemes with respect to signals input from the first and second power allocators 111-1 and 111-2. Herein, different multiplexing schemes may be allocated to the two users. For example, an Orthogonal Frequency Division Multiplex Access (OFDMA) scheme may be allocated to one user, and a Multi Carrier-Code Division Multiple Access (MC-CDMA) scheme may be allocated to the other user.

The re-modulator 115 reconstructs 1D signals input from the first and second multiplexing allocators 113-1 and 113-2 into 2D signals. In this case, according to the present invention, the two users are multiplexed by dividing one phase into an I-phase and a Q-phase. A process of allocating multiplexing schemes will be described below in detail with reference to FIG. 3.

The complex IFFT unit 117 performs an IFFT operation on a signal input from the re-modulator 115 and then outputs time-domain sample data. The CP adder 119 adds a copy of a predetermined number of last bits of the sample data received from the complex IFFT unit 117 to the beginning of the sample data, to output an OFDM symbol. As known by those of skill in the art, in practice, a baseband OFDM symbol is subject to a Radio Frequency (RF) process and then is transmitted on the air interface through an antenna.

For example, assume that the first modulating/coding unit 105-1 outputs a complex signal of a+b*j when data of the first user 103-1 is coded and modulated, and the second modulating/coding unit 105-2 outputs a complex signal of c+d*j when data of the second user 103-2 is coded and modulated. Then, a 1D signal output from the first 2D/1D converter 107-1 corresponds to the a and b for the first user 103-1, and the c and d for the second user 103-2. In this case, the users 103-1 and 103-2 may respectively use different modulation schemes or different multiplexing schemes. Thereafter, the re-modulator 115 reconstructs the 1D signal to a 2D signal, for example, a+d*j and c+b*j, or a+c*j and b+d*j.

Figure 2:
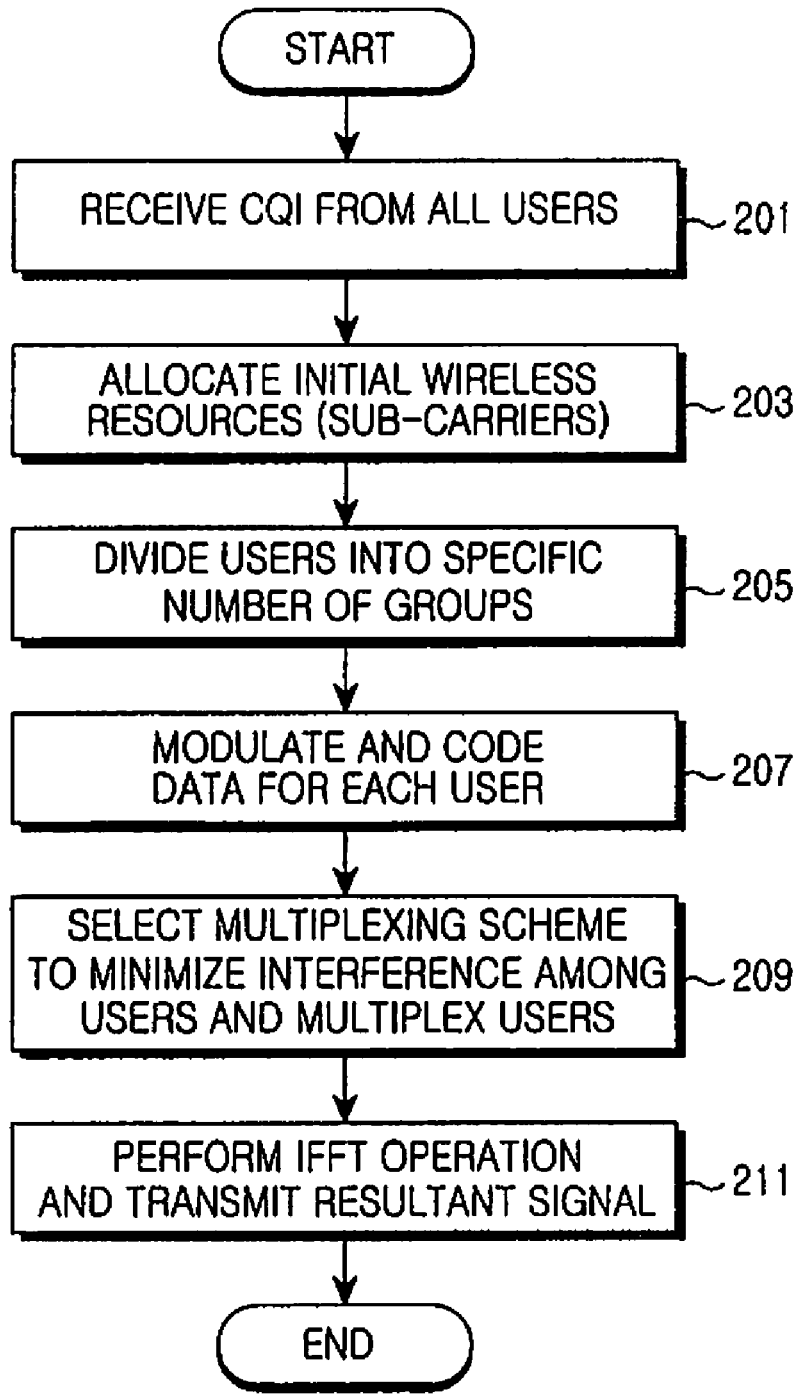
FIG. 2 is a flowchart of a resource allocation and transmission method in a mobile communication system according to the present invention.

FIG. 2 is a flowchart of a resource allocation and transmission method in a mobile communication system according to the present invention. Referring to FIG. 2, in step 201, a transmitter receives CQI from all users. In step 203, the transmitter allocates initial wireless resources by using the CQI. Herein, the wireless resources are sub-carriers.

In step 205, the transmitter divides the users, to which the same wireless resource is allocated, into a specific number of groups.

In step 207, the transmitter modulates and codes data to be transmitted to the users. The modulation may be performed using different modulation schemes for the respective users. For example, the first user may use a QPSK modulation scheme, and the second user may use a 16QAM modulation scheme.

In step 209, the transmitter selects a multiplexing scheme by which interference among the users is minimized, and then multiplexes the respective users according to the selected multiplexing scheme. Herein, the multiplexing may be performed using different multiplexing schemes for the respective user. For example, the first user may use an OFDMA scheme, and the second user may use an MC-CDMA scheme. The interference is determined using the CQI received from each user.

In step 211, the transmitter performs an IFFT operation on a multiplexed signal, and transmits the resultant signal to a corresponding user. Thereafter, the procedure ends.

Figure 3A:
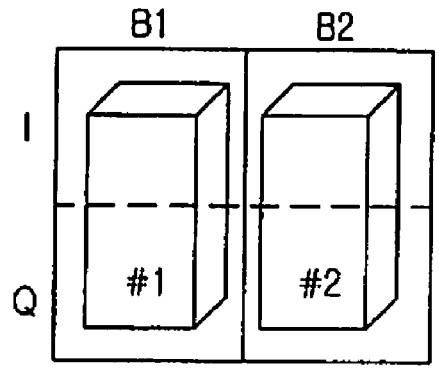
FIGS. 3A to 3C illustrate a process in which multiplexing schemes are allocated according to the present invention.
Figure 3B:
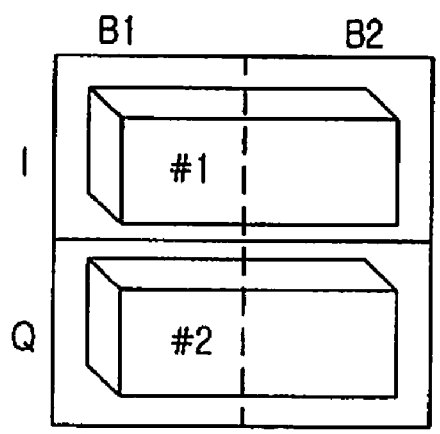
Figure 3C:
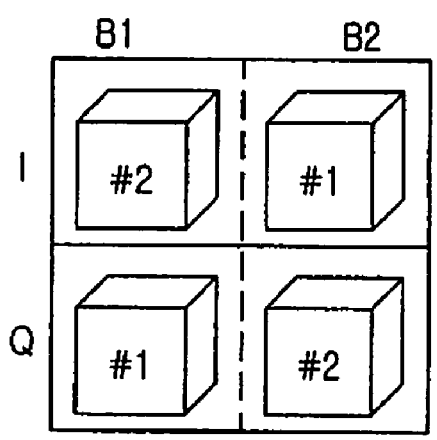

FIGS. 3A to 3C illustrate a process in which multiplexing schemes are allocated according to the present invention, assuming that two users are multiplexed by dividing one phase into an I-phase and a Q-phase.

Referring to FIG. 3A, I- and Q-phases are allocated to one user when using the conventional OFDMA based system. That is, I- and Q-phases of a Band one (B1) are allocated to a first user, and I- and Q-phase of a Band two (B2) are allocated to a second user.

On the other hand, in the present invention, as shown in FIGS. 3B and 3C, the two users share the same band by additionally dividing the phases. In the case shown in FIG. 3B and FIG. 3C, a bandwidth twice as high as in the conventional OFDMA based system is required to maintain a data transfer rate of each user. Referring to FIG. 3B, I-phase of B1 and I-phase of B2 are allocated to the first user, and Q-phase of B1 and Q-phase of B2 are allocated to the second user. Referring to FIG. 3C, Q-phase of B1 and I-phase of B2 are allocated to the first user, and I-phase of B1 and Q-phase of B2 are allocated to the second user.

As such, since a phase is further divided in the present invention, the I- and Q-phases can use different modulation schemes or different multiplexing schemes, thereby providing flexibility in resource allocation. In addition, there is an advantage in that there is no restriction on frequency orthogonality, which has been a problem in the conventional resource allocation method.

Figure 4A:
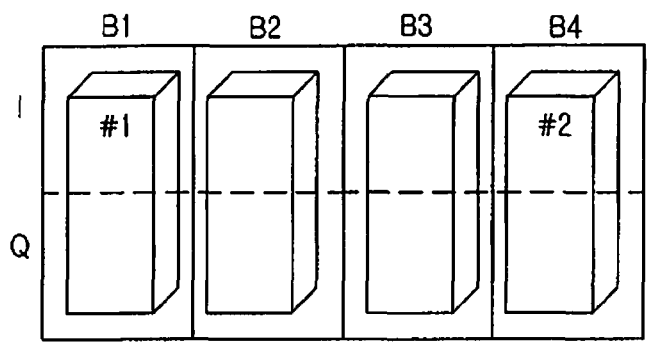
FIGS. 4A to 4C compare the conventional method based on an Orthogonal Frequency Division Multiplex Access (OFDMA) scheme with a method of the present invention for reducing interference caused by the same channel in a multi-cell environment.
Figure 4B:
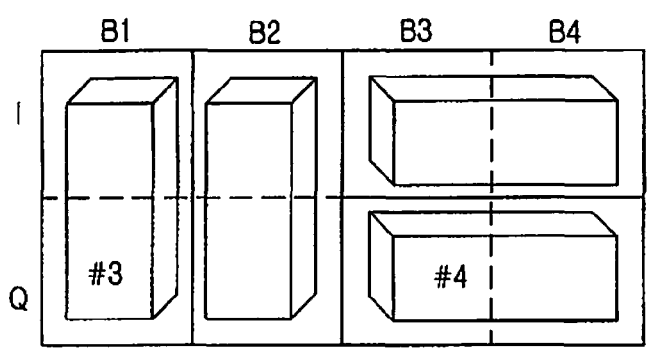
Figure 4C:
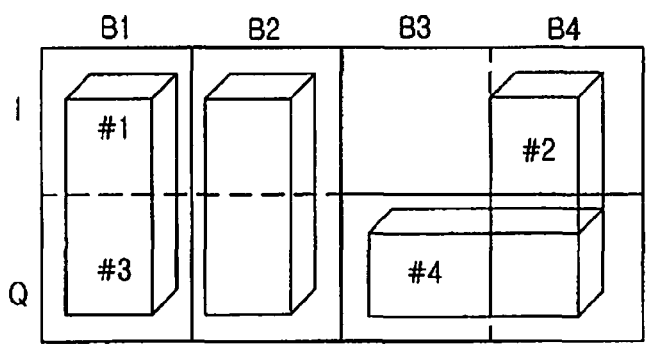

FIGS. 4A to 4C compare the conventional method based on the OFDMA scheme with a method of the present invention for reducing interference caused by the same channel in a multi-cell environment. In FIGS. 4A to 4C, it is assumed that all users #1, #2, #3, and #4 are located in a cell boundary area. Conventionally, the same multiplexing scheme is allocated to each user, and thus when the number of users increases, the same band (e.g., B1) may be allocated to a plurality of users (e.g., user #1 and user #3 (see FIGS. 4A and 4B)). In this case, user #3 interferes with user #1 (FIG. 4C), which leads to performance degradation to each user. Eventually, B1 cannot be allocated to user #1.

However, in the present invention, different multiplexing schemes are allocated to the respective users, and thus the mutual performance degradation can be reduced when the number of users increases. For example, referring to FIG. 4A, user #2 uses the conventional OFDMA scheme shown in FIG. 3A, and referring to FIG. 4B, user #4 uses the multiplexing scheme shown FIG. 3B. As a result, referring to FIG. 4C, performance degradation caused by mutual interference occurs only for Q-phase of B4. In this case, a receiver may perform a channel coding operation so as to detect a signal indicating where the performance degradation occurs.

According to the present invention, a new multiplexing scheme is used for data transmission in a mobile communication system. Thus, a scheduling gain is improved without additional feedback. In addition, when different multiplexing schemes are allocated to respective users by sharing the same sub-carrier, performance degradation decreases when mutual interference occurs between adjacent cells as the number of users increases.

While the invention has been shown and described with reference to a certain preferred embodiment thereof, it is a mere exemplary application. Thus, it will be understood by those skilled in the art that various changes in form and details may be made therein without departing from the spirit and scope of the invention as defined by the appended claims.

What is claimed is:

1. An apparatus for allocating resources in a mobile communication system, the apparatus comprising:
  a wireless resource allocator for allocating wireless resources to one or more users using Channel Quality Information (COI) received from the users;
  a modulating/coding unit for modulating transmission data of the users according to a predetermined modulation scheme and for outputting a complex signal;
  a 2-Dimensional (2D)/1-Dimensional (1D) converter for converting the complex signal into a 1D signal;
  a multiplex-allocator for allocating a multiplexing scheme of the 1D signal using the allocated wireless resources; and
  a re-modulator for reconstructing the 1D signal to a 2D signal and for allocating two components of the 2D signal to two different frequency bands.

2. The apparatus of claim 1, wherein the two components of the 2D signal are allocated to one phase in the different frequency bands.

3. The apparatus of claim 1, wherein the two components of the 2D signal are respectively allocated to separate phases in the different frequency bands.

4. The apparatus of claim 1, wherein one of the two different frequency bands includes a portion of the two components of the 2D signal.

5. A method of allocating resources in a mobile communication system, the method comprising the steps of:
  allocating wireless resources to one or more users using Channel Quality Information (COI) received from the users;
  modulating transmission data of one or more users according to a predetermined modulation scheme and outputting a complex signal;
  converting the complex signal into a 1-Dimensional (1D) signal;
  allocating a multiplexing scheme of the 1D signal using the allocated wireless resources; and
  reconstructing the 1D signal to a 2-Dimensional (2D) signal and allocating two components of the 2D signal to two different frequency bands.

6. The method of claim 5, wherein the two components of the 2D signal are allocated to one phase in each of the different frequency bands.

7. The method of claim 5, wherein the two components of the 2D signal are respectively allocated to separate phases in the different frequency bands.

8. The method of claim 5, wherein one of the two different frequency bands includes a portion of the components of the 2D signal.

9. The method of claim 6, wherein the one phase is an I-phase.

10. The method of claim 6, wherein the one phase is a Q-phase.

* * * * *